US009172483B2

(12) United States Patent
Gupta et al.

(10) Patent No.: US 9,172,483 B2
(45) Date of Patent: Oct. 27, 2015

(54) SIGNAL QUALITY ESTIMATION AND CONTROL (71) Applicants: Pankaj Gupta, Rajasthan (IN); Sriram Murali, Bangalore (IN); Jaiganesh Balakrishnan, Bangalore (IN); Sanjay Vishwakarma, Kanpur (IN)

(72) Inventors: Pankaj Gupta, Rajasthan (IN); Sriram Murali, Bangalore (IN); Jaiganesh Balakrishnan, Bangalore (IN); Sanjay Vishwakarma, Kanpur (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 351 days.

(21) Appl. No.: 13/899,868

(22) Filed: May 22, 2013

(65) Prior Publication Data
US 2014/0348328 A1    Nov. 27, 2014

(51) Int. Cl.
H04B 17/00    (2015.01)
H04H 60/58    (2008.01)
H04B 1/16    (2006.01)
H04H 40/45    (2008.01)

(52) U.S. Cl.
CPC ............. *H04H 60/58* (2013.01); *H04B 1/1646* (2013.01); *H04H 40/45* (2013.01)

(58) Field of Classification Search
USPC ........... 455/67.11, 115.1, 212, 218, 221, 222, 455/226.1, 226.3, 296, 337; 381/3, 10–13
See application file for complete search history.

(56) References Cited

U.S. PATENT DOCUMENTS

| 5,410,751 A * | 4/1995 | Yokoyama ................... 455/212 |
| 8,023,918 B2 | 9/2011 | Hanawalt et al. |
| 2006/0234660 A1* | 10/2006 | Kwak ......................... 455/226.3 |
| 2012/0257694 A1* | 10/2012 | Balakrishnan ............. 455/226.1 |
| 2014/0355764 A1* | 12/2014 | Elenes ............................... 381/3 |

FOREIGN PATENT DOCUMENTS

| EP | 0430468 A2 | 6/1991 |
| EP | 1289155 A1 | 3/2003 |

* cited by examiner

*Primary Examiner* — Thanh Le
(74) *Attorney, Agent, or Firm* — Lawrence J. Bassuk; Charles A. Brill; Frank D. Cimino (57) ABSTRACT

Several circuits and methods implemented to perform signal quality estimation and control are disclosed. In an embodiment, a method of signal quality estimation includes generating a demodulated signal associated with a radio signal. Information associated with a quality of the demodulated signal is accessed. Further, a value of radio frequency signal-to-noise ratio (RF-SNR) for the radio signal based on the information is estimated. Estimating the value of RF-SNR facilitates in signal quality estimation of the radio signal and control of the demodulated signal.

20 Claims, 7 Drawing Sheets

SIGNAL QUALITY ESTIMATION AND CONTROL

TECHNICAL FIELD

The present disclosure generally relates to the field of signal quality estimation and control.

BACKGROUND

Pursuant to an example scenario, estimating quality of a received signal in radio communications enables performance enhancement of various system parameters. For example, in a Frequency Modulation (FM) radio receiver, the consistency of perceptive audio quality is maintained across a wide variety of signal conditions by employing stereo noise control (SNC) mechanisms, such as, soft mute and mono-stereo blending. When the received signal to noise ratio (SNR) reduces in a radio receiver, the noise in a demodulated audio signal becomes relatively more perceptible. Soft mute is a technique used to attenuate a final audio output at low received SNRs to mitigate the noise audibility. Similarly, when the received SNR degrades, the audio output gradually switches from stereo to mono mode. In FM, optimal audio fidelity is maintained by dynamically scaling a stereo (L−R) signal by blending the stereo (L−R) signal with a mono (L+R) signal. Signal quality estimation is an important tool for enabling the SNC mechanisms, since the soft mute attenuation factor or the mono-stereo blending factor is to be controlled based on the signal condition.

SUMMARY

This Summary is provided to introduce a selection of concepts in a simplified form that are further described below in the Detailed Description. This Summary is not intended to identify key or important features of the claimed subject matter, nor is it intended to be used as an aid in determining the scope of the claimed subject matter.

A number of example circuits and methods, which are implemented so as to enable signal quality estimation and control, are disclosed. In an embodiment, a method of signal quality estimation and control is disclosed. The method includes generating a demodulated signal associated with a radio signal. Further, the method includes accessing an information associated with a quality of the demodulated signal. Furthermore, the method includes estimating a value of radio frequency signal-to-noise ratio (RF-SNR) for the radio signal based on the information. Estimating the value of RF-SNR facilitates in signal quality estimation of the radio signal and control of the demodulated signal.

Additionally, in an embodiment, a circuit configured for signal quality estimation and control is disclosed that includes a frequency shifter circuit, a filter circuit, and an RF-SNR estimation circuit. The frequency shifter circuit is configured to convert a demodulated signal associated with a radio signal such that a signal-free region of the demodulated signal is around direct current (DC). The converted signal includes a signal component and a noise component. The filter circuit is coupled with the frequency shifter circuit and is configured to reject the signal component and retain the noise component. The radio frequency signal-to-noise ratio (RF-SNR) estimation circuit is coupled with the filter circuit and configured to estimate a value of a RF-SNR of the radio signal based on the noise component. Estimating the value of RF-SNR facilitates in signal quality estimation of the radio signal and control of the demodulated signal.

Moreover, in an embodiment, a radio receiver is disclosed. The radio receiver includes a demodulator circuit, a signal quality estimation circuit, and a control circuit. The demodulator circuit is configured to generate a demodulated signal associated with a radio signal. The signal quality estimation circuit is coupled with the demodulator circuit and configured to access an information associated with a quality of the demodulated signal, and estimate a value of radio frequency signal-to-noise ratio (RF-SNR) for the radio signal based on the information, wherein estimating the value of RF-SNR facilitates in signal quality estimation of the radio signal. The control circuit is coupled with the signal quality estimation circuit and configured to control the demodulated signal based on the estimated value of the RF-SNR.

Other aspects and example embodiments are provided in the drawings and the detailed description that follow.

The drawings referred to in this description are not to be understood as being drawn to scale except if specifically noted, and such drawings are only example in nature.

DETAILED DESCRIPTION

Pursuant to an example scenario, in radio communication systems, information is transmitted on broadcast channels through radio signals. For example, information on broadcast channels in an FM band consist of a frequency modulated version of a multiplexed (MPX) format baseband signal (hereinafter referred to as 'MPX signal'). As used herein, the MPX signal is generated by combining multiple signals into one composite signal in such a way that the original signals are reconstituted by an FM receiver. The MPX signal includes left (L) channel information and right (R) channel information that are used by the FM receiver to produce audio outputs. In an example, the MPX signal format includes L+R (left-plus-right) information, L−R (left-minus-right) information and a 19 kilohertz (KHz) pilot carrier signal. An example of the MPX signal is explained in FIG. 1.

Figure 1:
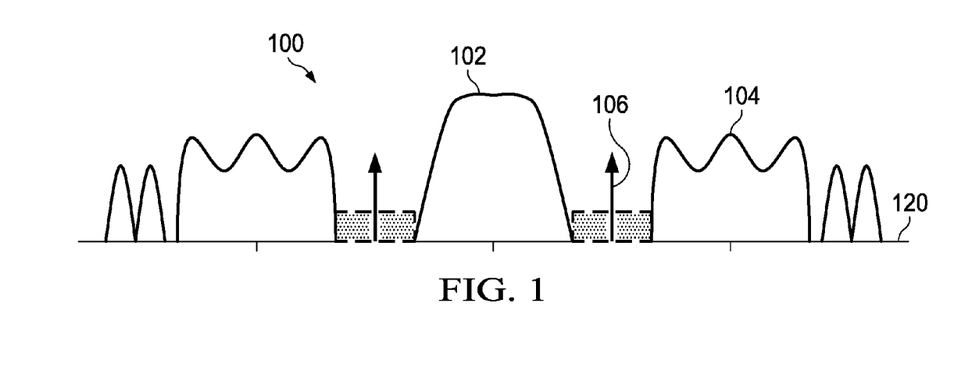
FIG. 1 illustrates an example FM multiplexed signal associated with a FM broadcast in accordance with an example scenario.

Referring to FIG. 1, an MPX signal 100 is illustrated along a frequency axis represented by numeral 120. The MPX signal 100 includes a sum signal (L+R) 102 and an amplitude modulated difference signal (L−R) 104 with a suppressed carrier. The sum signal (L+R) 102 contains the information of the left plus (+) right audio signal, and the difference signal (L−R) 104 contains the information of the left minus (−) right audio signal. To allow a demodulation of the amplitude modulated difference signal, a pilot carrier signal 106 is added to the MPX signal 100. The L+R information lies in a band between 15 Hz and 15 kHz, the L−R information lies around 38 kHz, spanning the frequency band from 23 KHz to 53 KHz, and the pilot carrier signal 106 lies at 19 kHz.

A stereo decoder is configured to convert a demodulated stereo MPX signal back into left (L) and right (R) audio signals. For example, most FM receivers are configured to produce a full stereo output by generating a left (L) channel audio output signal by adding the L+R and L−R signals, and a right (R) channel audio output signal by subtracting the L+R and L−R signals. If a mono output is selected, the FM receiver allows passing the full (L+R) signal to both the left (L) channel and the right (R) channel. In addition, varying degrees of mono stereo blending is applied to maintain optimum audio fidelity.

Pursuant to an example scenario, radio broadcast band receivers such as FM broadcast band receivers suffer from noise due to strong nearby blockers and/or other sources or conditions. In order to mitigate the noise problem, the FM receivers employ Stereo Noise Control (SNC) to thereby improve audio perception during reception. The SNC mechanisms for improving audio perception include 'soft mute' and 'mono-stereo blending'. For instance, when the signal to noise ratio (SNR) of the received signal reduces, the noise in the demodulated audio signal becomes relatively more perceptible. Soft mute is a technique used to attenuate the final audio output at low received SNRs to mitigate the noise audibility. In other words, soft muting is employed to mask transients in an audio device. As used herein, a "transient" is an abrupt change in the operation of a circuit or a spurious signal caused by such abrupt change. For example, upon putting on earphones before plugging the earphones into an operating radio, stereo, or cellular telephone, the sound of transients are experienced. Other transients occur during the operation of audio electronic devices. When the received signal quality is good, then mono/stereo blending is performed to trade-off audio SNR with the stereo separation. The effects of soft-muting and mono/stereo blending for mitigating noise audibility are illustrated with reference to FIGS. 2A and 2B, respectively.

Figure 2A:
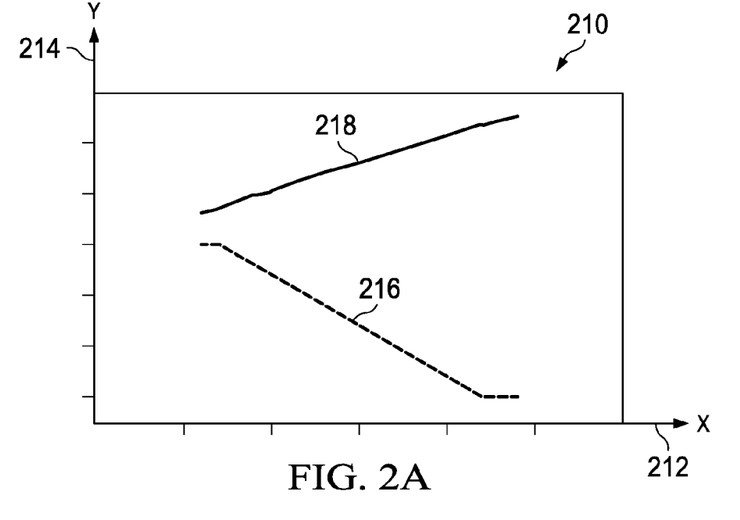
FIGS. 2A and 2B are example plots illustrating variation between RF-SNR and audio SNR for SNC in accordance with an example scenario.
Figure 2B:
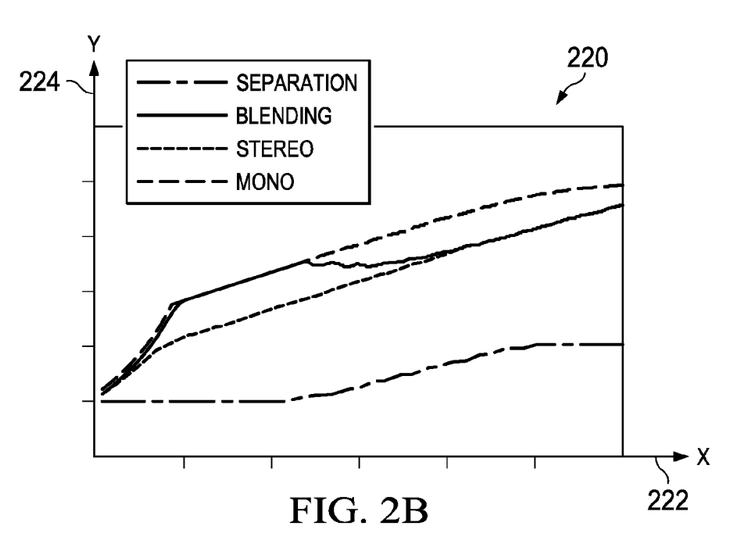

Referring to FIG. 2A, a plot 210 representing example variations between RF-SNR (plotted on x-axis 212) and audio SNR (plotted on y-axis 214) for soft-mute attenuation, is illustrated. A variation 216 indicates an example of audio attenuation being increased at lower RF-SNR levels, in response to a signal quality metric shown by a variation 218 that is strongly correlated with the RF-SNR. This helps in minimizing noise perceptibility at low RF-SNR levels. Similarly, when the SNR of the received signal degrades, the audio output gradually switches from stereo to mono mode. This is explained with reference to FIG. 2B. As illustrated in FIG. 2B, a plot 220 represents example variation between RF-SNR (plotted on x-axis 222) and audio SNR (plotted on y-axis 224) for mono/stereo blending. Mono/stereo blending is utilized to trade-off audio SNR with stereo separation when received signal quality is good. Optimal audio fidelity is maintained by dynamically scaling the stereo (L−R) signal, while blending with the mono (L+R) signal.

Various techniques are employed for mitigating the stereo noise by soft-muting and mono/stereo blending. One such technique employs received signal strength indicator (RSSI) determination for predicting RF-SNR of the signal received at the radio receiver, for example an FM receiver. The RSSI is a measure of strength of the most recent signal that was when it reached its destination. Higher values of RSSI indicate a stronger signal. In certain example scenarios, the determination of RSSI is utilized to blend the audio output from stereo to mono when the RSSI indicates poor signal strength. The utilization of RSSI for mitigating noise signal in a radio receiver, for example, in an FM receiver is explained further in reference to FIG. 3.

Figure 3:
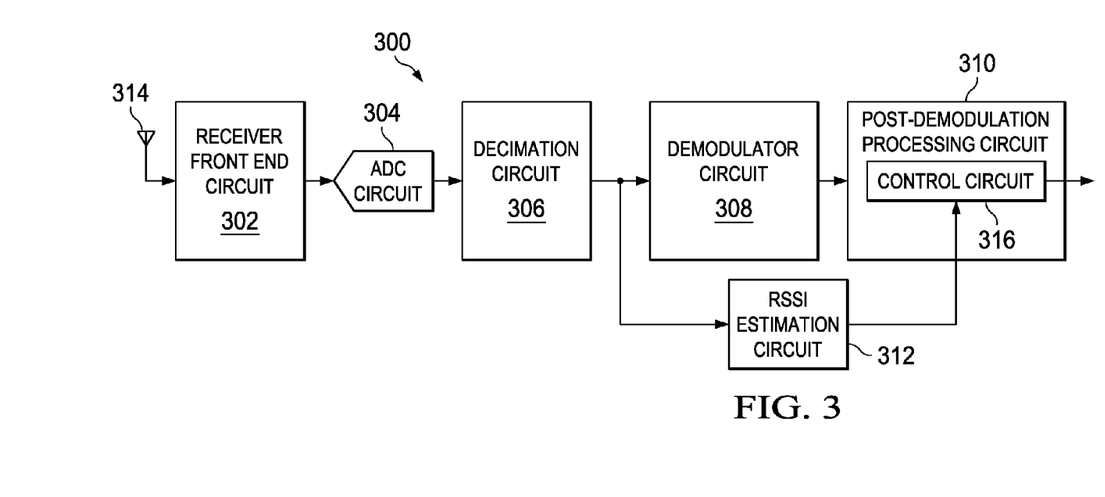
FIG. 3 illustrates a block diagram of an example radio receiver for SNC in accordance with an example scenario.

FIG. 3 is a circuit diagram 300 of a radio receiver, in accordance with an example scenario. The radio receiver is configured to determine the received signal quality based on a determination of RSSI associated with the received signal. As illustrated in FIG. 3, the circuit 300 of the radio receiver is shown to include a receiver front end circuit 302, an analog-to-digital converter (ADC) circuit 304, a decimation circuit 306 representing decimation stages, a demodulator circuit 308, a post-demodulation processing circuit 310, and a RSSI estimation circuit 312. The receiver front-end circuit 302 is configured to convert a radio signal received from an antenna 314 to a baseband signal. The ADC circuit 304 is configured to convert the output signal of the receiver front end circuit 302 into a digital signal. The RSSI estimation circuit 312 is configured to indicate RSSI based on the output of the decimation circuit 306. The demodulator circuit 308 is configured to demodulate the output of the decimation circuit 306. The output of the demodulator circuit 308 includes a demodulated signal (for example, an FM multiplexed signal), which is provided to the post-demodulation processing circuit 310. The post-demodulation processing circuit 310 includes a control circuit 316 that is configured to process the demodulated signal (received from the demodulator circuit 308) based on the output of the RSSI circuit. In an FM receiver, the control circuit 316 that is configured to process the demodulated signal for example, an MPX signal to output, for example, L and R audio signals. An SNC circuit in an FM receiver is an example of the control circuit 316. It is to be noted herein, that RSSI is the primary control parameter (or metric) used in the radio receiver illustrated by the circuit 300 for performing SNC.

As discussed with reference to FIG. 3, the RSSI metric reflects the signal quality of the signal received at the antenna 314 of the circuit 300. However, it is to be noted that the RSSI metric reflects the true signal quality only when the noise power at the receiver, including all factors such as antenna noise, receiver noise figure, thermal noise, etc., are known precisely. Under realistic field conditions with different types of antenna configurations/orientations, the noise at the input of the receiver front end circuit 302 varies significantly. For example, in portable FM receivers, there is a very high degree of variability in the antenna impedance and/or gain as a function of FM channel frequency, antenna orientation, and the like. This results in significant variability in the noise figure of the composite system (including the antenna). Various example plots indicating variation of noise profile and gain as a function of channel frequency, antenna orientation, antenna types, and the like are illustrated with reference to FIGS. 4A and 4B.

Figure 4A:
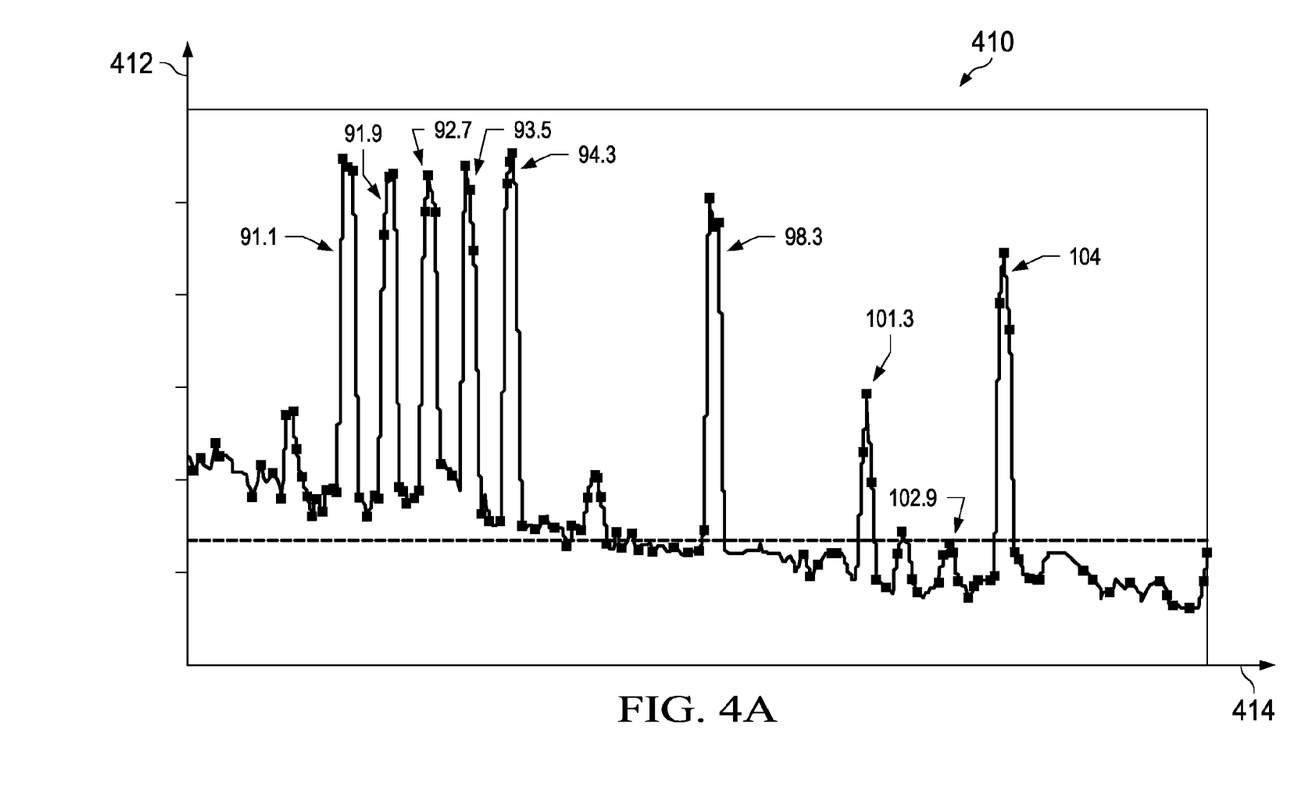
FIGS. 4A and 4B illustrate plots showing variation pertaining to an example received signal strength indicator (RSSI)-based signal quality estimation in a radio receiver in accordance with an example scenario.
Figure 4B:
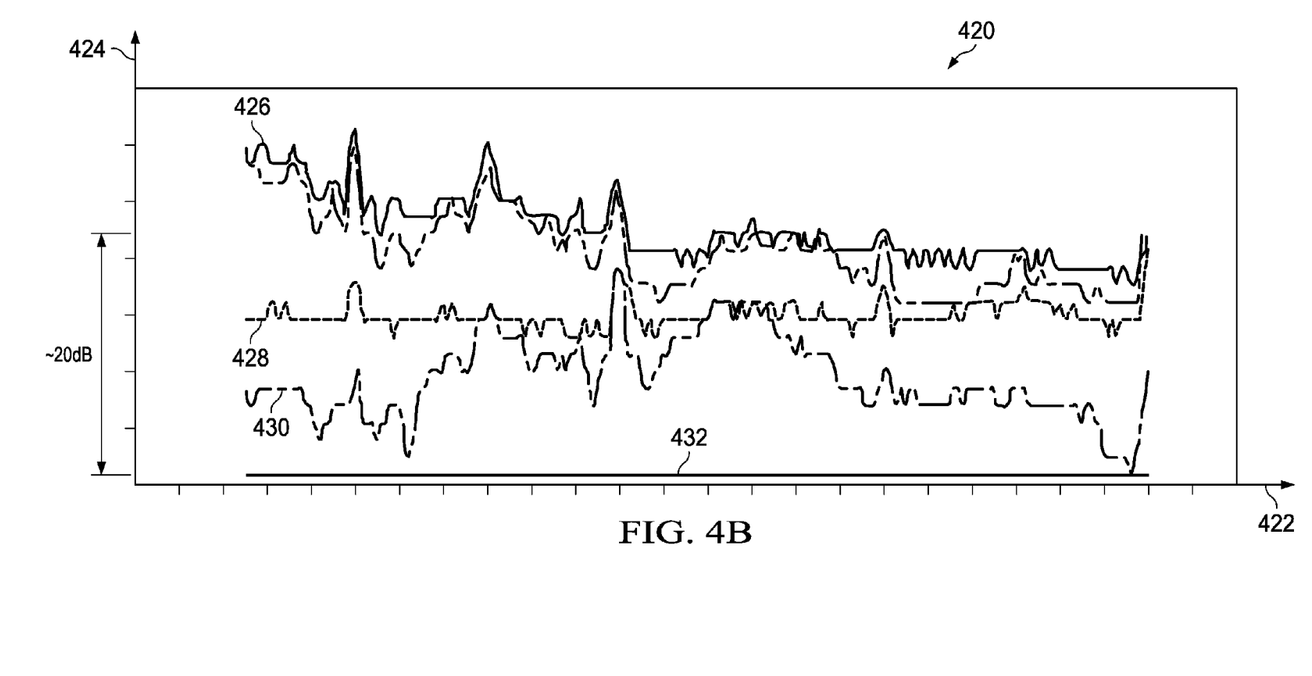

Referring to FIG. 4A, a variation 410 of RSSI (along y-axis 412) with FM channel frequency (along x-axis 414) is illustrated. In the present example plot, the measurement was performed close to an open window using a headset antenna. As is seen from FIG. 4A, the noise profile and gain vary with respect to the FM channel frequency. Another example plot, for example, a plot 420 of channel frequency (along x-axis 422) with RSSI (measured in an RF shielded area) (along y-axis 424) is illustrated in FIG. 4B. As illustrated, the plots such as plots 426, 428, 430 shows variation of in-band noise power with channel frequency for different antenna orientations and antenna types. As is seen from FIG. 4B, there are large variations (over ~20 dB) in the measured noise, which are significantly higher than thermal noise level 432. Moreover, there is a significant variation in the values of RSSI metric with channel frequency for different types of antenna used. Accordingly, it is derived that RSSI is not a true indicator of signal quality.

Typically, mapping between RSSI and RF-SNR is predicted under conditions where the noise figure of the radio receiver is stable and predictable, and accordingly, in such scenarios the RSSI is utilized as a metric for use in the control circuit associated with the post-demodulation processing circuit, for example, the post-demodulation processing circuit 310. However, in portable radio receivers, there is a very high degree of variability in the antenna impedance and/or gain as a function of factors such as channel frequency, antenna orientation, and the like. This results in significant variability in the noise figure of the composite system (including the antenna). Accordingly, there is a need for an RF-SNR estimation based signal quality estimation and control mechanism in radio receivers.

Various embodiments of the present disclosure provide solutions for RF-SNR estimation based signal quality estimation and control mechanism in radio receivers, such as radio receivers that overcome various performance obstacles, in addition to providing currently unavailable benefits. For instance, various embodiments provide signal quality estimation based on determination of a correlation between the noise power in a demodulated signal, and the quality of received signal. In an example embodiment, a circuit is provided that is configured to estimate a value of RF-SNR and subsequently control the demodulated signal in a radio receiver to thereby improve the quality of the demodulated signal. Various embodiments of the present disclosure are further described herein with reference to FIGS. 5 to 8.

Figure 5:
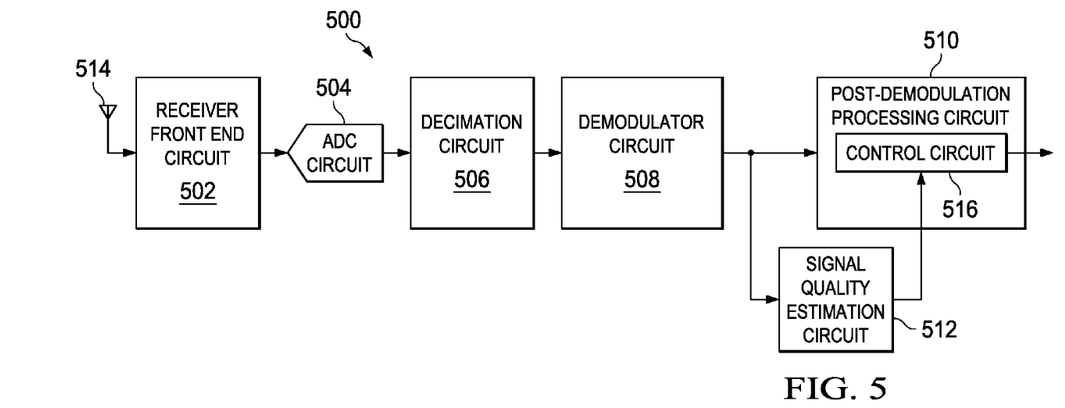
FIG. 5 illustrates a block diagram of an example radio receiver in accordance with an embodiment.

FIG. 5 illustrates a circuit diagram of a radio receiver 500 in accordance with an embodiment. An example of the radio receiver 500 is an FM receiver. The radio receiver is configured to provide RF-SNR estimation based signal quality estimation and control mechanism. The radio receiver 500 is configured to receive a radio signal, for example an FM signal. As shown in FIG. 5, the radio receiver 500 includes a receiver front end circuit 502, an analog-to-digital converter (ADC) circuit 504, a decimation circuit 506 representing decimation stages, a demodulator circuit 508, a post-demodulation processing circuit 510, a signal quality estimation circuit 512, and an antenna 514. Some circuit components such as the receiver front end circuit 502, the ADC circuit 504, the decimation circuit 506, the demodulator circuit 508, and the post-demodulation processing circuit 510 associated with the radio receiver 500 are similar to the respective components of the circuit 300 as described in reference to FIG. 3. The configuration and functionality of said circuits have already been explained with reference to FIG. 3, and accordingly the configuration and functionality thereof have not been provided again for the brevity of description.

As disclosed herein, the radio receiver 500 is shown to include the signal quality estimation circuit 512 that is configured to estimate the RF-SNR values of the radio signal for estimating signal quality of the radio signal. In an embodiment, the RF-SNR is determined based on the information associated with a quality of the demodulated signal that is being generated from the radio signal. In an embodiment, the signal quality estimation is used to perform optimal SNC in an FM radio receiver.

In particular, the radio receiver 500 facilitates in dynamically estimating signal quality by exploiting the correlation between the noise power in the demodulated signal and the quality of received signal. For example, in case of an FM receiver, a correlation between the noise power in an MPX signal with the SNR of the radio signal received at the input of the radio receiver 500 is utilized for estimating the signal quality of the radio signal. It will be understood the term 'MPX signal' refers to the FM demodulated signal that is output from the demodulator circuit 508 in an FM receiver. In an embodiment, the noise power in the demodulated signal is a function of RF-SNR and the phase noise of local oscillator (LO) of the radio receiver 500. At intermediate RF-SNR and below, the audio SNR is primarily limited by the front-end noise. This implies a high degree of correlation between the measured noise power and RF-SNR when the phase noise contribution is negligible in comparison to front-end noise.

In an embodiment, the received signal in a radio receiver 500, for example, an FM receiver is assumed to be corrupted by noise. The signal is frequency shifted to the base-band and processed to remove the out-of-band blockers as well as filter the out-of-band noise component. The frequency shifted complex base-band signal is demodulated to obtain the demodulated signal. At good RF-SNR, only the component of the noise that is tangential to the instantaneous complex FM phasor impacts the performance, while the radial component has no impact. The demodulated signal includes a desired signal component, phase noise contribution from the LO and a differentiated base band filtered Additive White Gaussian Noise (AWGN). It is to be noted that for scenarios, where the contribution from LO phase noise is negligible in comparison to the front end noise, the additive noise component at the output of the demodulator circuit 508 is totally determined by carrier amplitude and a quadrature component of base band noise. The noise level, after demodulation, is inversely proportional to the received signal amplitude. Hence, the noise power in demodulated signal is a direct indication of the signal conditions of the signal received at the radio receiver 500. In an embodiment, wherein the radio receiver 500 is an FM receiver, the average power in FM modulated signal is $A_c^2/2$, where $A_c$ is a FM carrier amplitude, and average noise power in transmitted bandwidth $T_T$ is $N_0 B_T$: where No is noise power spectral density. Thus, the RF-SNR is represented by the following expression (1):

$$\text{RFSNR} = A_c^2/2N_0 B_T \quad (1)$$

An MPX signal includes one or more signal-free regions. For example, as already described with reference to FIG. 1, the frequency band of the MPX signal between 15 kHz-23 kHz does not contain any signal component other than the pilot. Hence, the MPX signal at the FM receiver corresponding to the signal-free region (for example, the region associated with 15 kHz-23 kHz) contains only noise component and a signal component (for example, pilot carrier signal in the 15 kHz-23 kHz region). The noise power in the signal-free region associated with a band of f1 kHz-f2 kHz band is computed based on the following expression (2):

$$NoisePower = 2 * \int_{f1 kHz}^{f2 kHz} (No/A_c^2) * f^2 \, df \quad (2)$$

Here, $B_T$ is the FM transmission bandwidth (200 KHz), and the RF-SNR is expressed as $A_c^2/(2No*B_T)$. As seen from the above expression, the average noise power is inversely proportional to RF-SNR. On a dB scale, the noise power is given by the following expression (3):

$$\text{NoisePower\_dB} = 10*\log 10(\text{NoisePower}) \quad (3)$$
$$= k - \text{RF\_SNR\_dB}$$

where k is a constant, and the value of k is dependent on the frequency values f1 and f2) associated with a frequency band of the signal-free region.

In an example embodiment, the noise power in the 15 KHz-23 KHz frequency band is computed based on Expressions (1) and (2) to obtain:

$$\text{NoisePower} = 2*\int_{15kHz}^{23KHz}(No/A_c^2)*f^2\,df \quad (4)$$
$$= (8792/3)*10^9/(B_T*\text{RF\_SNR})$$

On a dB scale, the noise power is given by the following expression (5):

$$\text{NoisePower\_dB} = 10*\log 10(\text{NoisePower}) \quad (5)$$
$$= 71.66 - \text{RF\_SNR\_dB}$$

Expressions (3) and (5) indicate that there is a direct linear relationship between RF-SNR and the noise power measured. Therefore, RF-SNR of the received signal is directly estimated by measuring the noise power in frequency band associated with the signal free region of the demodulated signal, for example the MPX signal in case of an FM receiver. In an example embodiment, region associated with 15 KHz-23 KHz frequency band in an MPX signal corresponds to a signal-free region.

As shown in FIG. 5, the demodulator circuit 508 is coupled with or connected to the signal quality estimation circuit 512 and the post-demodulation processing circuit 510 so that the post-demodulation processing circuit 510 receives the digitized demodulated signal from the demodulator circuit 508. Additionally, the demodulator circuit 508 is coupled with or connected to the signal quality estimation circuit 512. The signal quality estimation circuit 512 is configured to determine the RF-SNR of the radio signal by analyzing the noise power of the signal-free region of the demodulated signal. The signal quality estimation circuit 512 then provides the estimated value of the RF-SNR to a control circuit 516 of the post-demodulation processing circuit 510. In case of an FM receiver, the control circuit 516 is configured to control the demodulated signal based on the estimated value of the RF-SNR. For example, in an FM receiver, the control circuit 516 utilizes the measured RF-SNR for performing the SNC. In an embodiment, performing the SNC includes performing mono-stereo blending control. For example, the control circuit 516 is configured to determine whether or not to blend to mono and/or the extent of blending from stereo to mono. In another embodiment, performing the SNC includes performing a soft mute control. It is noted that the signal quality estimation circuit 512 is implemented, if desired, by using a microcontroller and appropriate software code or firmware that is loaded into memory storage associated with the microcontroller. In addition, the signal quality estimation circuit 512 is implemented with hardware or any suitable combination's of hardware, firmware and/or software, as desired. An implementation of the signal quality estimation circuit 512 is explained with reference to FIG. 6.

Figure 6:
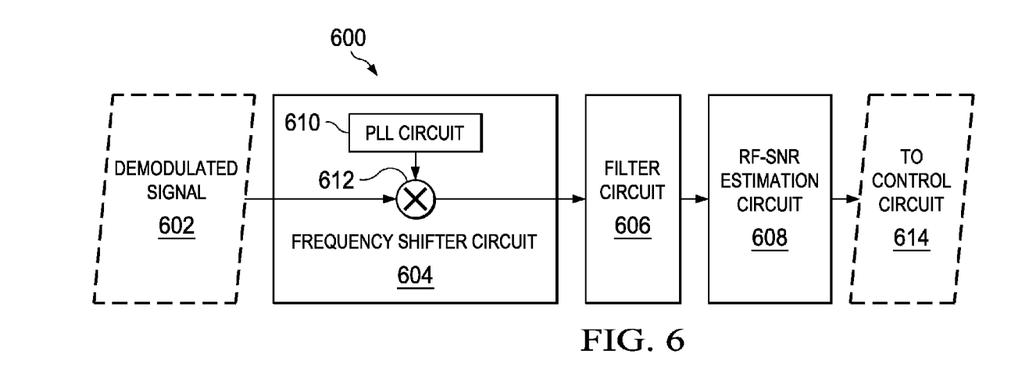
FIG. 6 is a block diagram of an example noise estimation circuit in accordance with an embodiment.

FIG. 6 is a block diagram of a signal quality estimation circuit 600, in accordance with an embodiment. The signal quality estimation circuit 600 is an example of the signal quality estimation circuit 512 explained with reference to FIG. 5. In an embodiment, the signal quality estimation circuit 600 is configured to estimate a signal quality of a received radio signal by exploiting a correlation between the noise power in the demodulated signal with the RF-SNR of the received radio signal. In an embodiment, the received radio signal is an FM signal. In an FM receiver, the signal quality estimation circuit 600 is configured to measure the noise power in a signal-free region, for example 15 kHz-23 kHz frequency band without the pilot carrier signal, in the received MPX spectrum.

In an example embodiment, the signal quality estimation circuit 600 is configured to frequency shift the demodulated signal such that the demodulated signal associated with the signal free region is at direct current (DC). It is to be noted that the demodulated signal associated with the signal-free region includes a signal component and a noise component. The signal quality estimation circuit 600 is configured to reject the signal component and retain the noise component of the demodulated signal. Further, the signal quality estimation circuit 600 is configured to measure the power associated with the noise component of the demodulated signal. The measured power of the noise component includes the noise power associated with the demodulated signal in the signal-free region. As discussed with reference to FIG. 5, the noise power bears a relation with the RF-SNR of the received radio signal, and accordingly enables estimation of the RF-SNR from the signal quality estimation circuit 600.

In an embodiment, the signal quality estimation circuit 600 is configured to receive a demodulated signal. In an example embodiment, for example in a signal quality estimation circuit associated with an FM receiver, the signal quality estimation circuit 600 receives a demodulated MPX signal 602 from a demodulator circuit. An example of the demodulator circuit includes the demodulator circuit 508 (explained with reference to FIG. 5). The signal quality estimation circuit 600 is configured to access an information associated with the quality of the demodulated signal. In an embodiment, the signal quality estimation circuit 600 is configured to access an information associated with a SNR of the demodulated signal, and estimate a value of RF-SNR for the radio signal based on the information. In an embodiment, the signal quality estimation circuit 600 includes a frequency shifter circuit 604, a filter circuit 606, and a RF-SNR estimation circuit 608.

The frequency shifter circuit 604 is configured to convert the demodulated signal 602 received as input such that a signal-free region of the demodulated signal 602 is around DC. In an embodiment, for example, in case of the radio receiver being an FM receiver, the frequency shifter 604 is configured to down-convert the MPX signal such that the frequency-shifted signal associated with the signal-free region is around DC. In an embodiment, the signal-free region of the demodulated signal 602 includes a signal component, such as a pilot carrier signal and a noise component. In an embodiment, the pilot carrier signal is associated with the 15 kHz-23 kHz frequency band of the demodulated signal 602. In an embodiment, the frequency shifter circuit 604 includes a PLL circuit 610 coupled with a mixer 612 for tracking a phase of the signal associated with the signal-free region of the demodulated signal. The mixer 612 is configured to multiply an output of the PLL circuit 610 and the demodulated signal to generate demodulated signal.

The filter circuit 606 is coupled with the frequency shifter circuit 604 and is configured to reject the signal component and retain the noise component of the frequency shifted demodulated signal in the signal-free region. For example, for the signal-free region associated with the pilot carrier signal, the filter circuit 606 is configured to remove the pilot signal at DC and all signals beyond 4 KHz offset from DC such that only the noise component is retained. In an embodiment, the filter circuit 606 includes one or more half-band filters for removing the signal component and retaining the noise component. For example, in an FM receiver where the output of the demodulator circuit is available at a signal sampling rate of 192 kHz, the filter circuit 606 includes a first half band filter (192 kHz to 96 kHz), a second half band filter (96 kHz to 48 kHz), a third half band fitter (48 kHz to 24 kHz) and an finite impulse response (FIR) fitter (600 kHz to 3 kHz). In an embodiment, the FIR filter includes a null at DC and a 4 kHz cut-off frequency.

The RF-SNR estimation circuit 608 is coupled with the filter circuit 606, and is configured to estimate a value of RF-SNR of the radio signal based on the noise component of the frequency shifted signal associated with the signal-free region. In an embodiment, a noise power associated with the noise component of the frequency shifted signal is measured by accumulating square of the samples at the output of the filter circuit 606. The measurement window is programmed to provide trade-off between noise estimation accuracy and measurement time. As discussed with reference to FIG. 5, the noise component is indicative of the noise power associated with the signal free region of the demodulated signal, and accordingly provides an estimate of the RF-SNR. In an embodiment, for example, in an FM receiver, the noise power measured by the RF-SNR estimation circuit 608 is:

$$\text{NoisePower\_dB} = 10 * \log 10(NoisePower)$$
$$= k - \text{RF\_SNR\_dB}$$

In an embodiment, the RF-SNR estimation circuit 608 is coupled with a control circuit, for example, the control circuit 516 (explained with reference to FIG. 5). As illustrated in FIG. 6, an output of the RF-SNR estimation circuit 608 is input to the control circuit as indicated by the block 614. In an embodiment, the control circuit is configured to utilize the estimated value of the RF-SNR for processing of the demodulated signal. For example, in an FM receiver, the control circuit is configured to perform SNC based on the estimated value of RF-SNR. In an embodiment, performing the SNC includes performing mono-stereo blending control. In another embodiment, performing SNC includes performing soft mute control. Various plots illustrating the performing mono-stereo blending control and soft mute control based on RF-SNR estimating are described with reference to FIGS. 7A, 7B and 7C.

Figure 7A:
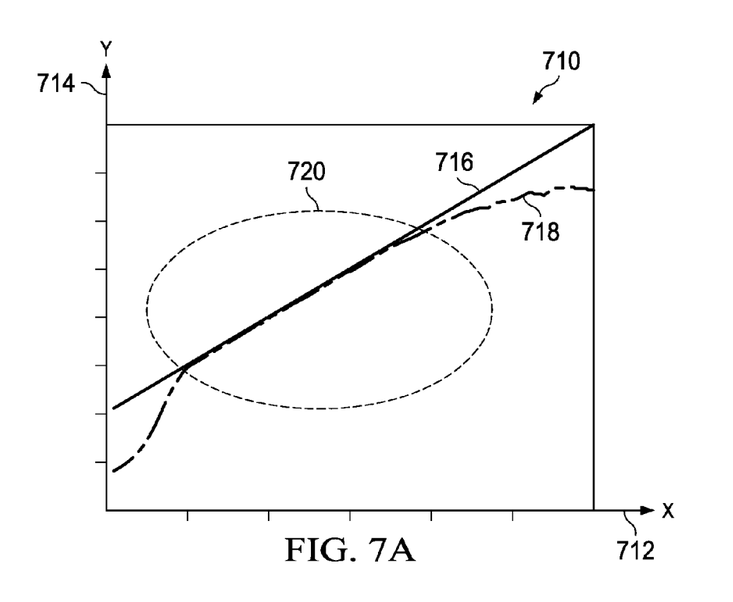
FIGS. 7A, 7B and 7C illustrate an example performance of a noise estimation circuit for SNC in accordance with an embodiment.
Figure 7B:
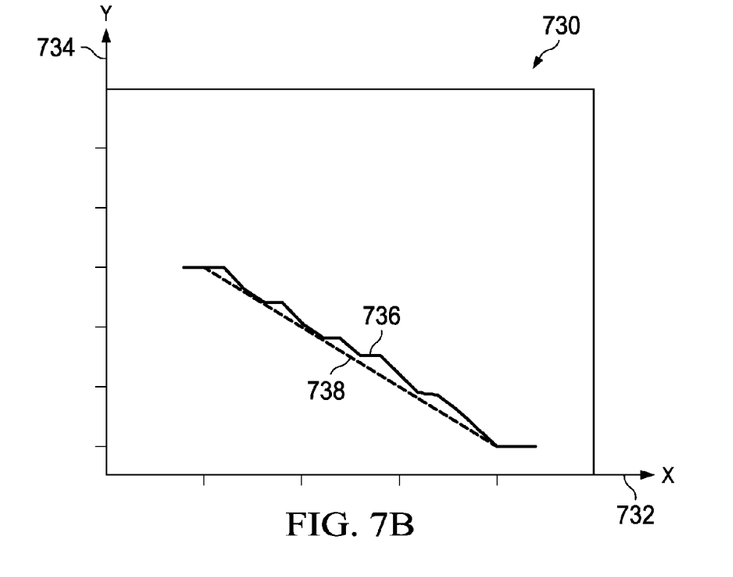
Figure 7C:
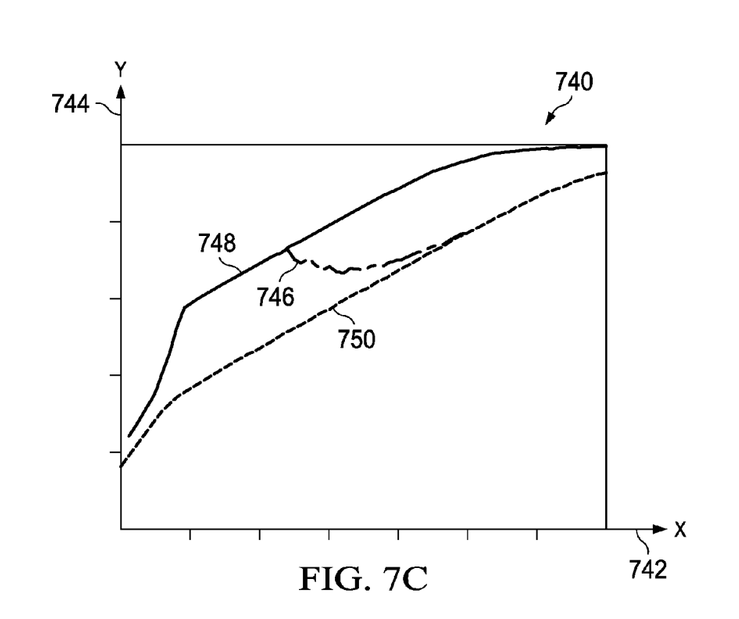

FIGS. 7A, 7B and 7C illustrate the performance of the signal quality estimation circuit such as the signal quality estimation circuit 600 for SNC in an FM receiver, in accordance with an embodiment. Particularly, FIG. 7A is a plot 710 between actual RF-SNR (plotted along x-axis 712) and estimated RF-SNR (plotted along y-axis 714). The plot 710 shows a comparison between the actual RF-SNR 716 (measured, for example, based on laboratory simulations) and the estimated RF-SNR 718 (estimated by utilizing the signal quality estimation circuit, for example, the signal quality estimation circuit 600). As illustrated in FIG. 7A, there is a high degree of correlation (depicted by a region enclosed by an enclosure 720) between the estimated RF-SNR and the actual RF-SNR, particularly in a range of interest (for example, between 8 dB to 40 dB).

Referring to FIG. 7B, a plot 730 illustrating the audio attenuation (along y-axis 732) (indicative of performance of the signal quality estimation circuit 600) in a system on chip (SoC) as a function of the RF input level (along x-axis 734) is shown. In the present example scenario, the soft mute performance under poor signal conditions (for example, under thermal noise dominated scenario) is evaluated. As illustrated herein, a plot 736 illustrating performance of the signal quality estimation circuit 600 matches closely with the desired soft mute performance (illustrated by a plot 738). FIG. 7C illustrates the performance of the signal quality estimation circuit for SNC, in accordance with an embodiment. Particularly, FIG. 7C is a plot 740 between audio SNR (along y-axis 742) and RF-SNR (along x-axis 744) illustrating SNC mechanism resulting in a transition (shown by 746) from a mono-only performance (illustrated by a plot 748) to a full-stereo performance (illustrated by a plot 750), by utilizing the signal quality estimation circuit 600 to transition between two plots (748 and 750). A reference to FIGS. 7A, 7B and 7C indicates that the signal quality estimation circuit 600 facilitates in improving perceptive audio quality during FM reception. A method of signal quality estimation and control based on RF-SNR estimation is explained further with reference to FIG. 8.

Figure 8:
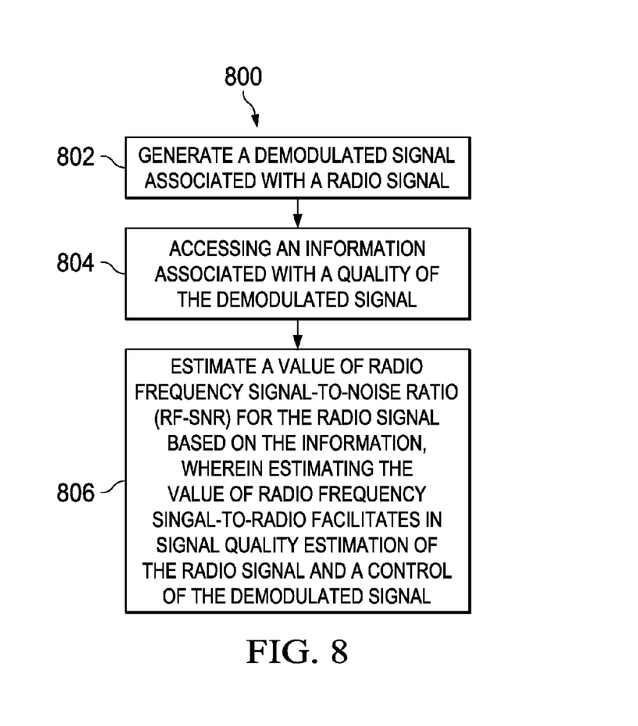
FIG. 8 illustrates a flow diagram of an example method of noise estimation in a radio receiver in accordance with an embodiment.

FIG. 8 illustrates a flow diagram of an example method 800 of signal quality estimation and control in a radio receiver, in accordance with an embodiment. The method 800 includes utilizing an estimated value of RF-SNR for estimation quality of a received radio signal and control of a demodulated signal associated with the radio signal in a radio receiver, for example, an FM receiver. In certain embodiments, operations of method 800 are performed by a circuit, such as, for example, the signal quality estimation circuit 600 (see, e.g., FIG. 6), configured to facilitate in estimating the value of RF-SNR associated with the radio signal in the radio receiver.

At block 802, the method includes generating a demodulated signal associated with a radio signal. In an embodiment, the radio signal is received at an input of the radio receiver. In particular, the radio signal is received at a receiver front end circuit of the radio receiver, and demodulated by a demodulator circuit coupled with the receiver front end circuit. An example of the demodulator circuit includes a demodulator circuit 508 (see, e.g. FIG. 5). In an embodiment, the radio signal includes an FM signal such that the FM signal is demodulated by the demodulator circuit to generate an MPX signal.

At block 804, the method includes accessing an information associated with a quality of the demodulated signal. In an embodiment, the information includes a noise power value indicating a noise power associated with a signal-free region of the demodulated signal. In an embodiment, for example, in an MPX signal, the signal-free region of the MPX signal includes a frequency band between 15 kHz-23 kHz. In an embodiment, the frequency band between 15 kHz-23 kHz pertains to pilot carrier signal of the demodulated signal, for example, the MPX signal.

In an FM receiver, for accessing the noise power in the signal free region of the MPX signal, the MPX signal is frequency shifted such that the frequency shifted MPX signal associated with the signal-free region is around DC. The frequency shifted MPX signal includes a noise component and a signal component. In an embodiment, the signal component is rejected and only the noise component is retained. In an embodiment, a filter is applied to reject the DC and all signals above 4 kHz and the noise power is estimated. In an embodiment, the noise power is estimated by accumulating square of the samples at the output of the filter. In an embodiment, a FIR filter including a null at DC and a 4 kHz cut-off frequency is utilized for rejecting the DC and all signals above 4 kHz.

At block 806, the method includes estimating a value of a RF-SNR for the radio signal based on the information. For example, the value of the RF-SNR for the FM signal is estimated based on the noise power value associated with a signal free region of the MPX signal, as already discussed with reference to FIGS. 5 and 6. In an embodiment, the value of the RF-SNR is computed based on the following expression:

$$SNR_{RF}(dB) \approx 71.66 - NoisePower\ (dB)$$

In an embodiment, the estimated value of RF-SNR facilitates in signal quality estimation of the received radio signal. For example, the estimated value of RF-SNR is utilized in an FM receiver for performing SNC mechanism. In certain embodiments, performing the SNC includes performing mono/stereo blending control and/or performing soft mute control. The performance of the RF-SNR based signal quality estimation for soft muting and stereo blending have been discussed with reference to FIGS. 7B and 7C. In an embodiment, the estimated value of RF-SNR facilitates in the control of the demodulated signal, as discussed with reference to FIGS. 5 and 6.

Herein, the method of signal quality estimation and control is explained with reference to radio receiver, for example, FM based radio receiver. However, it will be understood that methods and circuits for estimation of a RF-SNR associated with the radio signal is utilized in a demodulation circuit of various other communication systems as well, such as those employing PM (Phase Modulation), FSK (Frequency Shift Keying), PSK (Phase Shift Keying), and the like, without deviating from the scope of the present disclosure. Additionally, as discussed herein with reference to FIG. 6, such communication systems allows the use of parameters associated with demodulated signal (for example, noise power in a signal-free region of the demodulated signal) to estimate a pre-demodulation SNR metric associated with the radio signal.

Without in any way limiting the scope, interpretation, or application of the claims appearing below, advantages of one or more of the example embodiments disclosed herein include providing signal quality estimation and control in a radio receiver. Various embodiments of the present technology provide signal quality estimation based on determination of a correlation between the noise power in the demodulated signal associated with a radio signal and the received RF-SNR. Various embodiments of the present technology provide a circuit for signal quality estimation and control that is configured to estimate a value of RF-SNR and subsequently perform control based on the estimated value of RF-SNR. The proposed technology overcomes the limitation of the received-signal strength based signal quality estimator under realistic field scenarios and various antenna configurations. The proposed technology is implemented in various applications such as soft mute, mono/stereo blending, audio quality indicator, and scenario based current reduction that are enabled by the proposed circuit.

It should be noted that reference throughout this specification to features, advantages, or similar language does not imply that all of the features and advantages should be, or are in, any single embodiment. Rather, language referring to the features and advantages is understood to mean that a specific feature, advantage, or characteristic described in connection with an embodiment is included in at least one embodiment of the present technology. Thus, discussions of the features and advantages, and similar language, throughout this specification do not necessarily, refer to the same embodiment.

Various embodiments of the present disclosure, as discussed above, are practiced with steps and/or operations in a different order, and/or with hardware elements in configurations which are different than those which are disclosed. Therefore, although the technology has been described based upon these example embodiments, it is noted that certain modifications, variations, and alternative constructions are apparent and well within the spirit and scope of the technology. Although various example embodiments of the present technology are described herein in a language specific to structural features and/or methodological acts, the subject matter defined in the appended claims is not necessarily limited to the specific features or acts described above. Rather, the specific features and acts described above are disclosed as example forms of implementing the claims.

What is claimed is:

1. A method of signal quality estimation and control, the method comprising:
   generating a demodulated signal associated with a radio signal;
   accessing an information associated with quality of the demodulated signal; and
   estimating a value of radio frequency signal-to-noise ratio (RF-SNR) for the radio signal based on the information, wherein estimating the value of RF-SNR facilitates in signal quality estimation of the radio signal and control of the demodulated signal.

2. The method of claim 1, wherein the radio signal comprises a frequency modulated (FM) signal, and the demodulated signal comprises a multiplexed (MPX) signal.

3. The method of claim 2, wherein the information comprises a noise power value associated with a signal free region of the MPX signal.

4. The method of claim 3, wherein the value of the RF-SNR is estimated by measuring the noise power value in the signal-free region of the MPX signal based on a formula defined as:

$$SNR_{RF}(dB) \approx k - NoisePower\ (dB),$$

where:
   $SNF_{RF}$ (dB) is the value of the RF-SNR on a decibel (dB) scale,
   NoisePower (dB) is the noise power value on the dB scale, and
   k is a constant, a value of k being dependent on frequency values associated with a frequency band of the signal-free region.

5. The method of claim 3, wherein the signal-free region of the MPX signal comprises a frequency band between 15 kilohertz (kHz) and 23 kHz.

6. The method of claim 3, further comprising:
   frequency shilling the MPX signal such that the signal-free region of the MPX signal is at direct current (DC), the frequency shifted signal comprising a signal component and a noise component in the signal-free region;
   rejecting the signal component and retaining the noise component; and
   calculating the noise power value associated with the noise component so as to estimate the value of the RF-SNR.

7. The method of claim 1, wherein performing control of the demodulated signal comprises performing a stereo noise control (SNC) based on the estimated value of the RF-SNR.

8. The method of claim 7, wherein performing the SNC comprises performing a mono-stereo blending control.

9. The method of claim 7, wherein performing the SNC comprises performing a soft mute control.

10. A circuit for signal quality estimation and control, the circuit comprising:
a frequency shifter circuit configured to convert a demodulated signal associated with a radio signal such that a signal-free region of the demodulated signal is around direct current (DC), the converted signal comprising a signal component and a noise component;
a filter circuit coupled with the frequency shifter circuit and configured to reject the signal component and retain the noise component; and
a radio frequency signal-to-noise ratio (RF-SNR) estimation circuit coupled with the filter circuit and configured to estimate a value of a RF-SNR of the radio signal based on the noise component, wherein estimating the value of RF-SNR facilitates in signal quality estimation of the radio signal and control of the demodulated signal.

11. The circuit of claim 10, further comprising: a demodulator circuit coupled with the frequency shifter circuit and configured to generate the demodulated signal associated with the radio signal.

12. The circuit of claim 10, wherein the frequency shifter circuit comprises:
a phase locked loop (PLL) circuit configured to track a phase of the demodulated signal associated with the signal-free region; and
a mixer coupled with the PLL circuit and the demodulator circuit, the mixer configured to multiply an output of the PLL circuit and the demodulated signal.

13. The circuit of claim 10, wherein the RF-SNR estimation circuit is configured to estimate the value of the RF-SNR by measuring the noise power value in the signal-free region of the MPX signal based on an equation defined as:

$$SNR_{RF}(dB) \approx k - \text{NoisePower}(dB)$$

where:
$SNF_{RF}$ (dB) is the value of the RF-SNR on a decibel (dB) scale,
NoisePower (dB) is the noise power value on the dB scale, and
k is a constant, a value of k being dependent on frequency values associated with a frequency band of the signal free region.

14. The circuit of claim 10, wherein the signal-free region of the demodulated MPX signal comprises a frequency band between 15 kilohertz (kHz) and 23 kHz.

15. A radio receiver, comprising:
a demodulator circuit configured to generate a demodulated signal associated with a radio signal; and
a signal quality estimation circuit coupled with the demodulator circuit, the signal quality estimation and control circuit configured to:
access an information associated with a quality of the demodulated signal, and
estimate a value of radio frequency signal-to-noise ratio (RF-SNR) for the radio signal based on the information, wherein estimating the value of the RF-SNR facilitates in signal quality estimation of the radio signal; and
a control circuit coupled with the signal quality estimation circuit and configured to control of the demodulated signal based on the estimated value of the RF-SNR.

16. The radio receiver of claim 15, wherein the radio signal comprises a frequency modulated (FM) signal, and the demodulated signal comprises a multiplexed (MPX) signal.

17. The radio receiver of claim 16, wherein the signal quality estimation and control circuit comprises:
a frequency shifter circuit configured to convert the MPX signal such that a signal-free region of the MPX signal is around direct current (DC), the frequency shifted signal comprising a signal component and a noise component;
a filter circuit coupled with the frequency shifter circuit and configured to reject the signal component and retain the noise component;
a radio frequency signal-to-noise ratio (RF-SNR) estimation circuit coupled with the filter circuit and configured to estimate a value of a RF-SNR of the MPX signal based on the noise component; and
a control circuit coupled with the RF-SNR estimation circuit and configured to utilize the estimated value of the RF-SNR for facilitating signal quality control in the radio receiver.

18. The radio receiver of claim 17, wherein the frequency shifter circuit comprises:
a phase locked loop (PLL) circuit configured to track a phase of the MPX signal; and
a mixer coupled with the PLL circuit and the demodulator circuit, the mixer configured to multiply an output of the PLL circuit and the MPX signal.

19. The radio receiver of claim 17, wherein the RF-SNR estimation circuit is configured to estimate the value of the RF-SNR based on a measurement of a noise power value in the signal-free region of the MPX signal based on an equation defined as:

$$SNR_{RF}(dB) \approx k - \text{NoisePower}(dB)$$

where:
$SNF_{RF}$ (0) is the value of the RF-SNR on a decibel (dB) scale,
NoisePower (dB) is the noise power value on the dB scale, and
k is a constant, a value of k being dependent on frequency values associated with a frequency band of the signal-free region.

20. The radio receiver of claim 19, wherein the signal-free region of the demodulated frequency MPX signal comprises a frequency band between 15 kilohertz (kHz) and 23 kHz.

* * * * *